United States Patent
Myers et al.

(10) Patent No.: US 8,954,979 B1
(45) Date of Patent: Feb. 10, 2015

(54) METHOD AND SYSTEM FOR MANAGING RESOURCES IN A NETWORK

(75) Inventors: Jeffrey D. Myers, Somerville, MA (US); Ran Gilboa, Cambridge, MA (US); Dongjun Sun, Shrewsbury, MA (US)

(73) Assignee: Netapp, Inc., Sunnyvale, CA (US)

( * ) Notice: Subject to any disclaimer, the term of this patent is extended or adjusted under 35 U.S.C. 154(b) by 580 days.

(21) Appl. No.: 13/209,659

(22) Filed: Aug. 15, 2011

(51) Int. Cl.
*G06F 9/46* (2006.01)

(52) U.S. Cl.
USPC .......................................... 718/104; 718/105

(58) Field of Classification Search
None
See application file for complete search history.

(56) References Cited

U.S. PATENT DOCUMENTS

| | | | |
|---|---|---|---|
| 6,711,649 B1* | 3/2004 | Bachmat et al. | 711/114 |
| 7,434,011 B2* | 10/2008 | Shue | 711/156 |
| 8,005,793 B1* | 8/2011 | Jernigan, IV | 707/639 |
| 8,037,344 B2* | 10/2011 | Hara et al. | 714/5.1 |
| 8,108,503 B2* | 1/2012 | Kern et al. | 709/223 |
| 8,261,268 B1* | 9/2012 | Forgette | 718/1 |
| 8,386,610 B2* | 2/2013 | Yahalom et al. | 709/226 |
| 8,433,801 B1* | 4/2013 | Yemini et al. | 709/226 |
| 8,560,671 B1* | 10/2013 | Yahalom et al. | 709/224 |
| 8,595,364 B2* | 11/2013 | Yahalom et al. | 709/226 |
| 2003/0055863 A1* | 3/2003 | Spiegel et al. | 709/104 |
| 2005/0138285 A1* | 6/2005 | Takaoka et al. | 711/114 |
| 2007/0088763 A1* | 4/2007 | Yahalom et al. | 707/201 |
| 2007/0112870 A1* | 5/2007 | Korupolu et al. | 707/200 |
| 2008/0082769 A1* | 4/2008 | Bouchou et al. | 711/161 |
| 2008/0098110 A1* | 4/2008 | Takeda et al. | 709/224 |
| 2008/0270674 A1* | 10/2008 | Ginzton | 711/6 |
| 2009/0094413 A1* | 4/2009 | Lehr et al. | 711/112 |
| 2009/0172666 A1* | 7/2009 | Yahalom et al. | 718/1 |
| 2009/0228589 A1* | 9/2009 | Korupolu | 709/226 |
| 2009/0235265 A1* | 9/2009 | Dawson et al. | 718/104 |
| 2009/0313367 A1* | 12/2009 | Alon et al. | 709/223 |
| 2010/0036850 A1* | 2/2010 | Garman et al. | 707/10 |
| 2010/0043004 A1* | 2/2010 | Tambi et al. | 718/103 |
| 2010/0070978 A1* | 3/2010 | Chawla et al. | 718/105 |
| 2010/0082300 A1* | 4/2010 | Hollingsworth et al. | 702/186 |
| 2010/0107013 A1* | 4/2010 | Mopur et al. | 714/37 |
| 2010/0211956 A1* | 8/2010 | Gopisetty et al. | 718/104 |
| 2011/0145528 A1* | 6/2011 | Watanabe et al. | 711/162 |
| 2011/0246740 A1* | 10/2011 | Yata et al. | 711/165 |
| 2012/0011320 A1* | 1/2012 | Maki et al. | 711/114 |
| 2012/0131573 A1* | 5/2012 | Dasari et al. | 718/1 |
| 2012/0137289 A1* | 5/2012 | Nolterieke et al. | 718/1 |
| 2012/0311475 A1* | 12/2012 | Wong | 715/772 |

* cited by examiner

*Primary Examiner* — Emerson Puente
*Assistant Examiner* — Hiren Patel
(74) *Attorney, Agent, or Firm* — Klein, O'Neill & Singh, LLP

(57) ABSTRACT

Machine implemented method and system is provided for managing resources within an operating environment having a plurality of computing systems and a plurality of virtual machines. The resources are monitored and resource utilization is compared to configured threshold values for managing over utilization. If resource utilization reaches the threshold value, then the resource is identified as being over utilized. One or more data structures are used to display and verify the over utilization on a display device. The root cause of the over utilization is identified and then corrective action may be taken to reduce the over utilization.

12 Claims, 17 Drawing Sheets

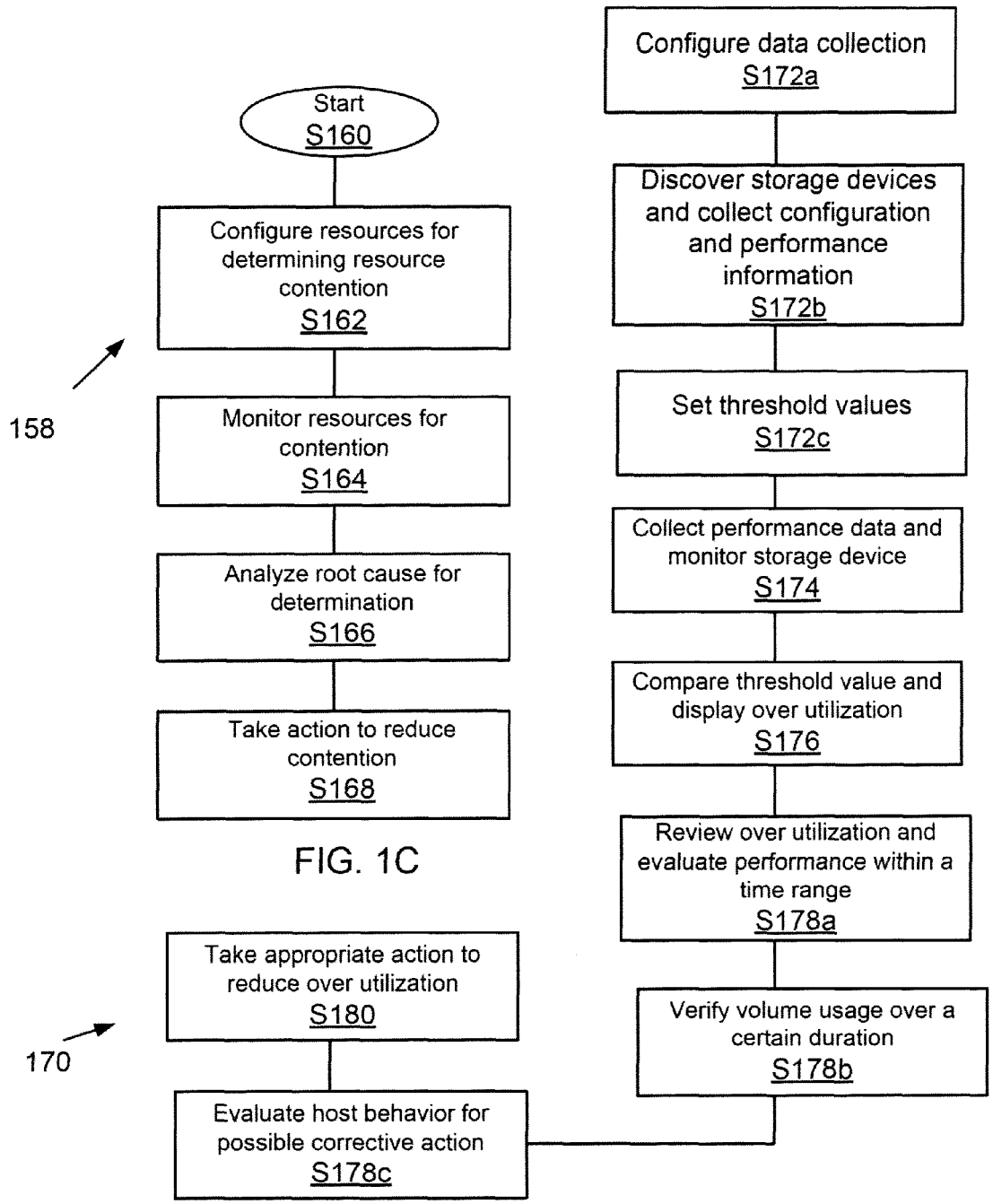

| Switch 149u | Port Id 149v | Transfer Rate 149w | Device Name 149x | Device Port ID 149y |
|---|---|---|---|---|
| SW1 | P1 | 6.8 | H2 | PH1 |
| SW2 | P2 | 4.5 | H4 | PH2 |
| ... | ... | ... | | |
| ... | ... | ... | | |
| ... | ... | ... | | |

149t

| Storage System Identifier 195a | Storage Device Identifier 195b | VM Identifier 195c | Time 195d | Utilization 195e | Throughput 195f | IOPS 195g |
|---|---|---|---|---|---|---|
| SANS1 | VSD1 | VM1, VM2 | $t_1$ | 90 | 6.00 | 270 |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |

195

| Volume Identifier 195j | VM Id 195i | Volume IOPS 195k | Device IOPS 195l | IOPS Distribution 195m | Volume Throughput 195n | Throughput (Device) 195o | Throughput Distribution 195p |
|---|---|---|---|---|---|---|---|
| VMV1 | VM1,VM2 | 6355 | 115 | 79 | 176 | 3.2 | 100 |
| VMV2 | VM3,VM4 | 27 | 0.49 | .21 | 0 | 0 | 0 |
| | | | | | | | |
| | | | | | | | |

| VM Disk 197a | VM 197b | IOPS 197c | Throughput 197d | Host Name 197e |
|---|---|---|---|---|
| VMSD1 | VM1,VM2 | 494 | 6 | VMM1 |
| VMSD2 | VM3,VM4 | 20 | 1 | VMM1 |
| ... | ... | | | |
| ... | ... | | | |
| ... | ... | | | |

197

METHOD AND SYSTEM FOR MANAGING RESOURCES IN A NETWORK

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2011, NetApp, Inc., All Rights Reserved.

TECHNICAL FIELD

The present disclosure relates to computing systems.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Storage systems are extensively used in NAS, SAN and virtual environments where a physical resource is time-shared among a plurality of independently operating processor executable virtual machines. Resources, for example, storage devices, in such operating environments are typically shared by a plurality of computing systems and applications. Sometimes, a resource may be over utilized, referred to herein as resource contention.

To determine a root cause of resource contention can be tedious and complex in today's operating environments where multiple computing systems and virtual machines access storage volumes that are spread across multiple storage devices in both NAS and SAN environments. Often a storage administrator has to manually obtain information regarding virtual machines, virtual drives and associated storage volumes from different entities to determine the root cause of resource contention at any given time. Because determining the root cause is inefficient, it also delays corrective action to remedy resource contention. Continuous efforts are being made to efficiently manage resources and reduce resource contention.

SUMMARY

In one embodiment, a machine implemented method and system is provided for efficiently managing resources within an operating environment having a plurality of computing systems and a plurality of virtual machines. The resources are monitored and resource utilization is compared to configurable threshold values. If resource utilization reaches the threshold value, then the resource is identified as being potentially over utilized. One or more data structures are then used to display and verify the over utilization. The root cause of the over utilization is identified and corrective action may be taken to reduce the over utilization.

In another embodiment, a machine implemented method is provided. The method includes collecting information for determining over utilization of a storage device accessed by a plurality of virtual machines executed by at least a computing system. The information includes an average number of input/output operations processed for a plurality of storage volumes within a certain duration and identity of the plurality of virtual machines accessing the plurality of storage volumes. The method further includes identifying a virtual machine from among the plurality of virtual machines accessing a storage volume identified as a potential cause of storage device over utilization.

In yet another embodiment, a machine implemented method is provided. The method includes collecting information for evaluating utilization of a storage device. The information includes an average number of input/output operations processed by a plurality of storage volumes of the storage device within a certain duration and an average amount of information transferred for each storage volume within the certain duration.

The method further includes comparing storage device utilization with a configurable threshold value for determining storage device over utilization; identifying a storage volume from among the plurality of storage volumes as a potential cause of storage device over utilization; providing information for verifying that the identified storage volume is the potential cause for the storage device over utilization during a period that is longer than the certain duration; and displaying information for identifying a computing system from among a plurality of computing systems accessing the identified storage volume causing the storage device utilization.

In another embodiment, a machine implemented method is provided. The method includes obtaining information for evaluating utilization of a storage device accessed via a switch having a plurality of ports in a storage area network. The information includes an average amount of information transferred for a plurality of storage volumes within a certain duration and a data transfer rate for each of the plurality of ports during the certain duration.

The method further identifying a storage volume from among the plurality of storage volumes as a potential cause of storage device over utilization; and using the data transfer rate for each of the plurality of ports for identifying a computing system causing the storage device over utilization from among a plurality of computing systems accessing the identified storage volume.

The embodiments disclosed herein provide an efficient solution for detecting resource contention and then determining the root cause of the resource contention. One does not have to manually request information from different entities to determine the root cause of resource contention at any given time. Because the root cause is determined efficiently, one is able to take appropriate corrective action to reduce resource contention.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIGS. 1C and 1D show process flow diagrams managing resources of the operating environment of FIG. 1A, according to one embodiment;

FIG. 1F-2 shows a screen shot graphically illustrating the relative performance of storage volumes for verifying the potential cause of storage device over utilization, according to one embodiment;

FIG. 1I-1 shows an example of a network topology for verifying the potential cause of storage device over utilization, according to one embodiment;

FIG. 1I-2 shows a screen shot graphically illustrating the relative performance of storage volumes for verifying the potential cause of storage device over utilization in a storage area network, according to one embodiment;

FIG. 1L shows examples of displays for analyzing storage device over utilization in an environment using virtual machines, according to one embodiment;

FIG. 2 shows an example of a storage system, used according to one embodiment;

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

Figure 1A:
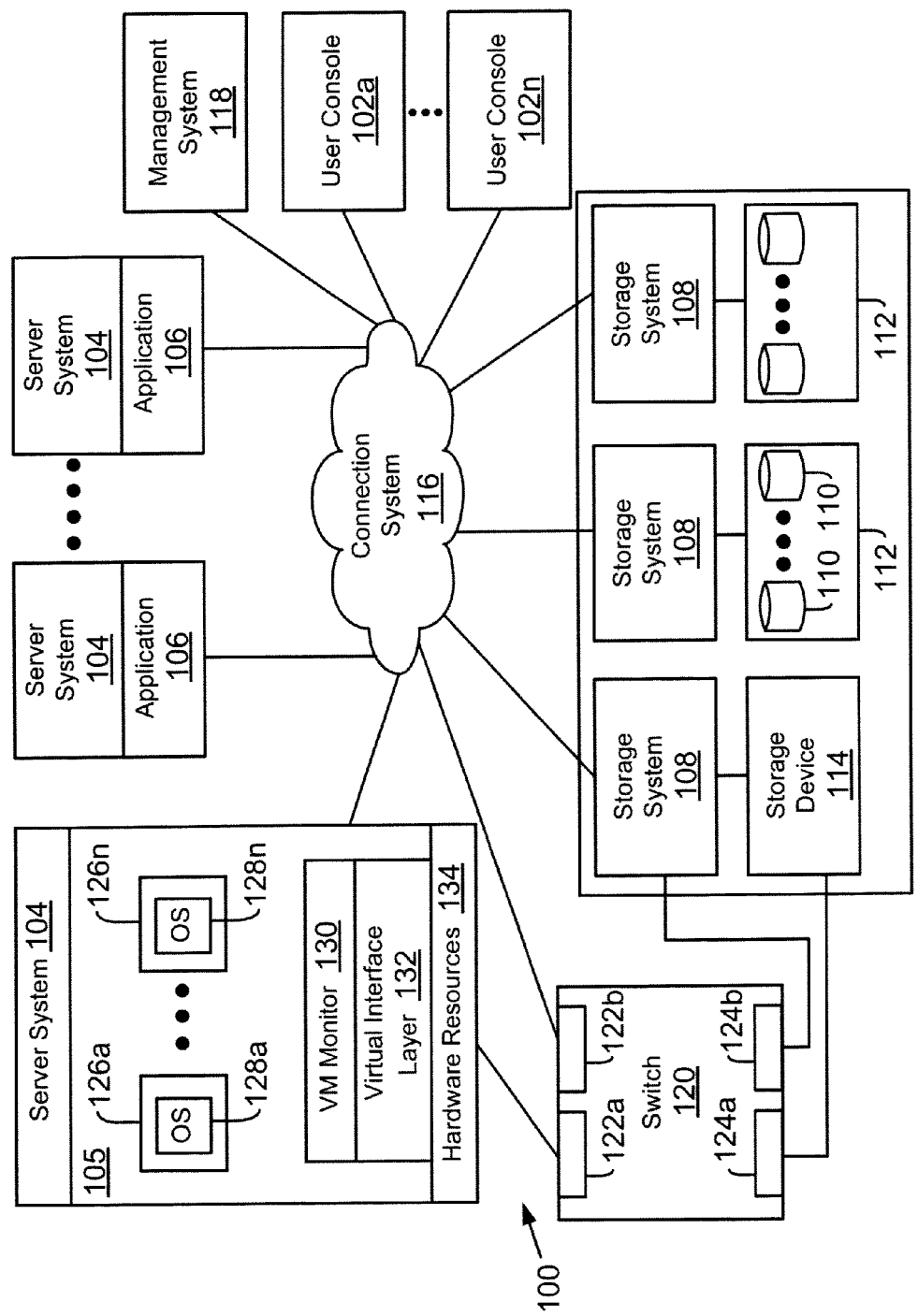
FIG. 1A shows an example of an operating environment for the various embodiments disclosed herein.

System 100:

FIG. 1A shows an example of an operating environment 100 (also referred to as system 100), for implementing the adaptive embodiments disclosed herein. In one embodiment, system 100 may include a plurality of computing systems 104 (may also be referred to and shown as server system 104 or as host system 104) that may access one or more storage systems 108 via a connection system 116 such as a local area network (LAN), wide area network (WAN), the Internet and others. The server systems 104 may communicate with each other via connection system 116, for example, for working collectively to provide data-access service to client systems 102a-102n and for collectively hosting a plurality of virtual machines as described below.

In one embodiment, in a SAN environment, one or more switch 120 may be used for communication between server systems 104 and storage device(s) 114. Switch 120 may include a plurality of ports, for example, 122a-122b and 124a-124b having logic and circuitry for handling network packets. Ports 122a-122b may be connected directly to server system 104 or via connection system 116. Ports 124a-124b may be connected to storage device 114 and storage system 108.

Server systems 104 may be general-purpose computers configured to execute applications 106 over a variety of operating systems, including the UNIX® and Microsoft Windows® operating systems. Application 106 may utilize data services of storage system 108 to access, store, and manage data in a set of storage devices 110/114 that are described below in detail. Application 106 may include an email exchange application, a database application or any other type of application. In another embodiment, application 106 may comprise a virtual machine as described below in more detail.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

Server 104 may also execute a virtual machine environment 105, according to one embodiment. In the virtual machine environment 105 a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual execution environment 105 executes a plurality of VMs 126a-126n. VMs 126a-126n execute a plurality of guest OS 128a-128n (may also be referred to as guest OS 128) that share hardware resources 134. As described above, hardware resources 134 may include CPU, memory, I/O devices, storage or any other hardware resource.

A virtual machine monitor (VMM) 130, for example, a processor executed hypervisor layer provided by VMWare Inc., Hyper-V layer provided by Microsoft Corporation or any other layer type, presents and manages the plurality of guest OS 128a-128n. The VMM 130 may include or interface with a virtualization layer (VIL) 132 that provides one or more virtualized hardware resource 134 to each guest OS. For example, VIL 132 presents physical storage at storage devices 110/114 as virtual storage (for example, as a virtual hard drive (VHD)) to VMs 126a-126n. The VMs use the VHDs to store information at storage devices 110 and 114.

In one embodiment, VMM 130 is executed by server system 104 with VMs 126a-126n. In another embodiment, VMM 130 may executed by an independent stand-alone computing system, of referred to as a hypervisor server or VMM server and VMs 126a-126n are presented via another computing system. It is noteworthy that various vendors provide virtualization environments, for example, VMware Corporation, Microsoft Corporation and others. The generic virtualization environment described above with respect to FIG. 1A may be customized depending on the virtual environment provider.

System 100 may also include a management system 118 for managing and configuring various elements of system 100. Management system 118 may include one or more computing systems for performing various tasks described below in detail. Details regarding management system 118 are provided below in more detail.

System 100 may also include one or more user consoles 102a-102n referred to as clients' 102a-102n. Clients' 102-102n may access server system 104 for storage related services provided by storage system 108 and also use management system 118 for obtaining management related services described below in detail.

In one embodiment, storage system 108 has access to a set of mass storage devices 110 (may be referred to as storage devices 110) within a storage subsystem 112. Storage system 108 may also access storage devices 114 via switch 120 that may be a Fibre Channel, Fibre Channel over Ethernet or any other type of switch. Storage devices 110 and 114 are referenced interchangeably throughout this specification.

Storage devices 110 are used by storage system 108 for storing information. The storage devices 110 may include writable storage device media such as magnetic disks, video tape, optical, DVD, magnetic tape, non-volatile memory devices for example, self-encrypting drives, flash memory devices and any other similar media adapted to store information. The storage devices 110 may be organized as one or more groups of Redundant Array of Independent (or Inexpensive) Disks (RAID). The embodiments disclosed herein are not limited to any particular storage device or storage device configuration.

In one embodiment, to facilitate access to storage devices 110, a storage operating system of storage system 108 "virtualizes" the storage space provided by storage devices 110/114. The storage system 108 can present or export data stored at storage devices 110 to server systems 104 and V 130 as a storage volume or one or more qtree sub-volume units. Each storage volume may be configured to store data files data containers or data objects), scripts, word processing documents, executable programs, and any other type of structured or unstructured data. From the perspective of the VMS/server systems, each volume can appear to be a single disk drive. However, each volume can represent the storage space in one disk, an aggregate of some or all of the storage space in multiple disks, a RAID group, or any other suitable set of storage space.

It is noteworthy that the term "disk" as used herein is intended to mean any storage device/space and not to limit the adaptive embodiments to any particular type of storage device, for example, hard disks.

The storage system 108 may be used to store and manage information at storage devices 114 based on a request generated by server system 104, management system 118, client 102 and/or a VM. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 (or VMs 126a-126n) transmits one or more input/output (I/O) commands, such as an NFS or CIFS request, over connection system 116 to the storage system 108. Storage system 108 receives the request, issues one or more I/O commands to storage devices 110 to read or write the data on behalf of the server system 104, and issues an NFS or CIFS response containing the requested data over the connection system 116 to the respective server system 104

In one embodiment, storage system 108 may have a distributed architecture, for example, a cluster based system that may include a separate N-("network") blade and D-(disk) blade. Briefly, the N-blade is used to communicate with host platform server system 104 and management system 118, while the D-blade is used to communicate with the storage devices 110 that are a part of a storage sub-system. The N-blade and D-blade may communicate with each other using an internal protocol.

Storage system 108 maintains various data structures (not shown) for storing information related to storage devices 110/114. For example, storage system 108 is aware of the identity and capabilities of storage device 110/114. Storage system 108 maintains the information regarding all the VMs and server systems that use storage device 110/114. This information may be kept as unique identifiers.

Because storage system 108 services read and write requests, it maintains information regarding the number of I/O operations that are processed within a time unit, for example, a second, referred to herein as "IOPS" by the storage device and by each storage volume. Storage system 108 is also aware of the identity of the sever systems that generate the I/O requests.

Storage system 108 also maintains information on a rate at which information is transferred (also referred to as a throughput rate) from the storage devices. The throughput rate is maintained for each storage volume of the storages devices.

The VMs 126a-126n, applications 106 and clients 102 may use resources within system 100, for example, storage devices 110/114. In some instances, the resources may become undesirably over utilized. An administrator of system 100 may want to know the root cause of the over utilization so that the administrator can take corrective measures to reduce over utilization.

In conventional systems, the process of determining the root cause of over utilization is typically manual and one has to use various queries for different sources to obtain information regarding entities using a resource. For example, when multiple virtual machines use multiple storage volumes that are spread out across multiple storage devices, ascertain which storage volume presented as a virtual drive to a particular virtual machine may be causing storage device over utilization is tedious and complex. An administrator may have to issue multiple queries to VMM 130, storage system 108 and other entities to determine which virtual machine may be causing over utilization. This is undesirable because it takes time and effort to identify a problem and ultimately solve a problem.

The embodiments described herein provide an efficient system and machine implemented methodology for displaying resource overuse and providing information regarding the overuse so that an appropriate action may be taken for reducing the over utilization. The details of management system 118 are provided below.

Figure 1B:
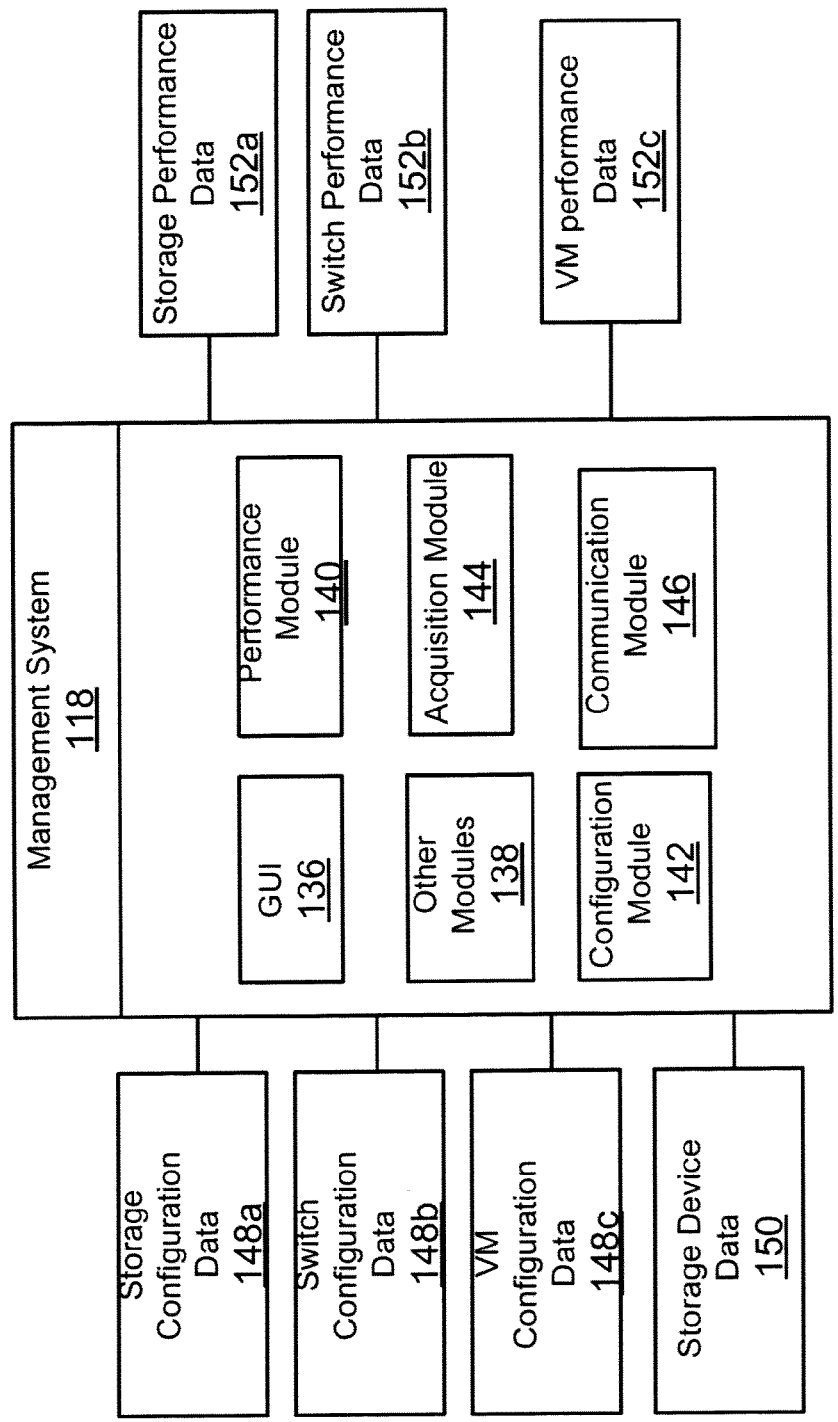
FIG. 1B shows an example of a management system, according to one embodiment.

Management System 118:

FIG. 1B shows a block diagram of management system 118 having a plurality of modules and using a plurality of data structures, according to one embodiment. The various modules may be implemented in one computing system or in a distributed environment among multiple computing systems. In the illustrated embodiment, the management system 118 may include a graphical user interface (GUI) module 136 to generate a GUI for use by a storage administrator or a user using a client system 102. In another embodiment, management system 118 may present a command line interface (CLI) to a user. The GUI may be used by a user to configure the various components of system 100, for example, switch 120, storage devices 110 and 114 and others. The GUI may also be used to view and analyze resource utilization as described below in more detail.

Management system 118 may include a communication module 146 that implements one or more conventional communication protocols and/or APIs to enable the various modules of management system 118 to communicate with the storage system 108, VMs 126a-126n, switch 120, server system 104 and clients 102.

Management system 118 maintains information regarding storage device 110 and 114 at a storage device data structure 150 that stores a name of a storage device manufacturer, a storage device identifier, a maximum number of IOPS that the device can handle and a throughput rate that the storage device is able to support. This information may be hardcoded and stored at a memory storage location.

In one embodiment, management system 118 also includes an acquisition module 144 that obtains information regarding storage devices 110/114 from storage system 108 and switch 120. Acquisition module 144 may send a discovery request to storage system 108 and switch 120 seeking storage device 110/114 and switch 120 information, respectively. The format and structure of the discovery request will depend on the protocol/standard used by acquisition module 144 to communicate with storage system 108 and switch 120.

The information may include an amount of data that is transferred to and from a storage device within a certain duration, a number of IOPS that are serviced by a storage device, the identity of the server systems (also referred as host systems) that use the storage devices, transfer rates of the switch ports and other information as described below.

Management system 118 also includes a processor executable configuration module 142 that stores configuration information for storage devices 110/114 and switch 120. The configuration information may be stored as data structures 148a-148c. In one embodiment, configuration information includes threshold values for various resources, for example, storage devices 110 and 114 and switch 120. The threshold values are used to indicate when resource contention or resource utilization is at an unacceptable level. The use of the threshold values is described below in more detail.

Management system 118 maintains storage configuration data 148a, switch configuration data 148b and VM configuration data 148c, according to one embodiment. The actual data for data structures 148a-148c may be acquired by acquisition module 144 from storage systems 108, switch 120 and VMM 130, respectively.

Storage configuration data 148a identifies the storage system 108 that manages a storage device, the storage volumes associated with the storage device and the identity of users (for example, server systems 104) that access the storage volumes. Storage configuration data 148a may be obtained from storage system 108.

Switch configuration data 148b identifies switch 120, the various ports of switch 120 and the identity of the devices/computing systems that are coupled to switch 120. Switch configuration data 148b is acquired by acquisition module 144 either directly from switch 120 or any other entity, according to one embodiment.

VM configuration data 148c identifies the VMM 130, for example, the hypervisor that presents and controls VMs 126a-126n. VM configuration data 148c also identifies the various VMs and the resources that are used by the VMs at any given time, for example, VHDs. VM configuration data 148c may also be acquired by acquisition module 144 from VMM 130 and storage system 108.

Management system 118 includes a performance module 140 that receives performance data regarding storage devices 110/114 and switch 120. The performance data may be stored as storage performance data 152a, switch performance data 152b and VM performance data 152c. The storage performance data 152a shows if a storage device is over utilized at a given time, the number of IOPS within certain duration and a throughput within the certain duration. The storage performance data 152a is compiled and transformed, according to one embodiment, as described below in more detail.

Switch performance data 152b includes performance of ports 122a-122d. For example, switch performance data 152b may show the data transfer rates for one or more of switch ports 122a-122d. The switch data may be used to ascertain which of the connected hosts may be causing over utilization of a storage device, as described below in more detail.

VM performance data 152c includes information regarding the various VMs, identity of the virtual disks used by the VMs and other information that is described below in more detail. It is noteworthy that the various data structures described above, namely, 148a-148c and 152a-152c may be integrated into a single data structure that is accessible to one or more modules of management system 118.

Management system 118 may also include other modules 138. The other modules 138 are not described in detail because the details are not germane to the inventive embodiments.

The various modules and data structures of management system 118 automate the process of determining the root cause of resource contention in general and storage device over utilization in particular. Management system 118 detects storage device over utilization and provides information via a GUI to verify the root cause. This allows a user to take appropriate corrective action.

The functionality of the various modules of management system 118 and the various data structures is described below in detail with respect to the various process flow diagrams.

Process Flow:

FIG. 1C shows a machine implemented process flow 158, according to one embodiment. Process 158 may be implemented by processor executable, configuration module 142, acquisition module 144, performance module 140 and a combination thereof. The process begins in block S160. In block S162, resources within system 100 are configured for determining resource contention. Examples of resources within system 100 include storage devices 110 and 114, switch 120, adapters (not shown) used by the VMs to issue I/O requests and others.

Resources in system 100 may be used by more than one computing system/application/VM. The user may setup a threshold value for a resource in system 100 to manage undesirable resource utilization. The threshold value may be stored as part of configuration data (for example, 148a-148c) at a storage device. Resource contention is triggered when resource utilization reaches the configured threshold value.

As an example, a storage device 110/114 may be identified as a resource. A maximum utilization for the storage device is set as a threshold value, for example, as a percentage. The percentage indicates the level of activity at a storage device compared to a maximum activity level that the storage device is capable of serving. Typically, a storage device is capable of serving a certain number of I/O requests for reading or writing information within a time interval. The storage device also can transfer a maximum amount of data within a time interval. When the number of I/O requests processed within a certain duration reaches a certain threshold level, then the storage device maybe over utilized, which causes contention and hence degrades storage device performance.

Another example of a resource is switch 120 of system 100. A maximum transfer rate may be set as a threshold value for each port of switch 120. The maximum transfer rate indicates the amount of information that a port transfers within a certain time frame.

In one embodiment, the threshold values for the resources are entered via a user interface, for example, a GUI provided by GUI module 136 or a command line interface (CLI) (not shown) on a display device (not shown). The threshold values are then stored in configuration data structure.

In block S164, resources of system 100 are monitored to determine if resource utilization has reached the threshold value. The resources may be monitored by performance module 140 that compares resource utilization with stored threshold values. Resource contention is triggered, if utilization of a particular resource reaches the threshold value. In one embodiment, acquisition module 144 collects information regarding the monitored resources over certain duration, for example, 8 hours. Performance module 140 then evaluates resource utilization over the 8 hour duration and if the average utilization during the duration reaches the threshold value, then resource contention is triggered.

The root cause of the contention is determined in block S166 and displayed on a display device. The root cause may be determined iteratively by using a plurality of data structures, as described below. In one embodiment, the process identifies all the affected users of a resource, for example, VMs, server system 104 and others. A storage administrator is able to prioritize over utilization conditions based on the severity and how it impacts the different users of a particular resource. Based on the root cause, the user may then take action to resolve contention, in block S168. The nature and type of action would depend on the resource and what may be causing the contention.

The process flow of FIG. 1C may be used for a storage device, switch or any other resource of system 100. FIGS. 1D and 1G show examples of managing storage device utilization in a NAS and SAN environment, respectively. FIG. 1K shows an example of managing storage device utilization where VMs are used to access storage space.

FIG. 1D shows a process 170 for managing storage devices 110 in a network attached storage environment. The process begins in block S172a when acquisition module 144 is configured to collect information regarding storage devices 110 for monitoring storage device utilization. In one embodiment, a user via a GUI may configure acquisition module 144 to collect information. The user may select the storage device, the type of data that is to be collected and the frequency of collecting information i.e. how often the information is collected.

In one embodiment, acquisition module 144 is configured to request storage system 108 to provide a throughput rate at which information is transferred by storage devices 110. Acquisition module 144 may be configured to collect information regarding the number of IOPS processed by the storage device 110. Acquisition module 144 is also configured to collect information regarding different storage volumes, their identity and identity of the storage volume users. Acquisition module 144 also collects the IOPS and throughput information for each storage volume.

In block S172b, acquisition module 144 discovers the storage devices 110 and collects configuration information from storage system 108. In one embodiment, acquisition module 144 may send a discovery packet to discover storage devices 110 and obtain the configuration information. The configuration information includes the storage device identity, identity of the storage volumes of the storage devices, identity of the users that are using the storage device or any other information. The configuration information may be stored as storage configuration data structure 148a that is managed and maintained by configuration module 142.

Performance data for each storage device is also collected and provided to performance module 140 that maintains storage performance data 152a. The performance data includes the number of IOPS and throughput for each storage device and storage device volume, as described below in more detail.

In block S172c, threshold values for the storage devices 110 may be set by a user. In one embodiment, the threshold values are set via a user interface provided by a processor executable module, for example, GUI module 136 (FIG. 1B). The threshold values are used to detect over utilization of a storage device at a given time or as an average over certain duration. The threshold values may be the same or different for different storage devices. It is noteworthy that although blocks S172a-172c have been shown as individual blocks, they may be a part of an integrated discovery/configuration/data collection process step.

As described above, the threshold value may be a percentage that shows how busy a storage device may be at a given time. For example, a threshold value of 87% indicates that the storage device has reached 87% of its maximum ability to service I/O operations.

In block S174, management system 118 continues to collect performance data and monitor storage space utilization of storage devices 110. Information regarding storage space utilization is acquired by acquisition module 144 from storage systems 108. In one embodiment, storage system 108 provides a storage system name, storage device identifiers, identifiers identifying host systems that use the storage device, rate at which I/O requests are processed, and the total throughput at any given time. Performance module 140 stores the information as storage performance data 152a.

In block S176, performance module 140 compares storage device utilization of a storage device with stored threshold values. Performance module 140 may compare the utilization over a certain duration. If the average utilization reaches the programmed threshold value, then performance module 140 may conclude that the storage device is over utilized. The over utilization may be displayed, for example, as 147h, shown in FIG. 1E. The display 147h is based on storage performance data 152a and storage configuration data 148a maintained by management system 118.

In one embodiment, display 147h includes a plurality of columns 147a-147g. Column 147a provides a name of the storage systems, for example, S1 and S2 that manage storage devices 110. This information may be obtained from storage configuration data 148a. Column 147b provides the name/identifier of a storage device, for example, D1. This information may also be obtained from storage configuration data 148a. Column 147c identifies the different host computing systems, for example, H1, H2 and H3 that access D1. This information may be obtained from storage configuration data 148a.

Column 147e shows storage device utilization at time, t1, provided in column 147d. Time t1 is the time when the utilization value has reached the threshold value. Both time t1 and the device utilization may be obtained from performance data 152a that is managed by performance module 140. As explained above, the utilization may be illustrated as a percentage, for example, 88, which indicates that storage device D1 has reached 88% of its maximum ability to service I/O operations.

Column 147f shows the average number of IOPS that are processed for a time unit corresponding to t1, for example the hour. In this example, 174 average IOPS are processed. Column 147g also shows the average throughput rate, i.e. the amount of data that is moved to and from a storage device within the same time unit corresponding to time t1. In this example, the throughput is shown as 6.30 MB/s.

Display 147h may be used by a user to identify when a storage device is in contention. For example, if the threshold utilization for device D1 is set to 80% and at time t1, the utilization is 88%, and then D1 is assumed to be in contention or over utilized.

In blocks S178a-178c, the root (or potential) cause of storage device over utilization is analyzed. In block S178a, the user may review over utilization and evaluate storage device performance within a time range, for example, a day or longer. The user identifies the storage volume (s) that may be causing the over utilization. The user using a computing system may then confirm the potential cause of over utilization in block S178b. For example, the user may use a stacked graph/histogram to view the relative performance of storage volumes over a time range. In block S178c, the user views host behavior to determine what corrective action may be taken to reduce over utilization.

Figure 1E:
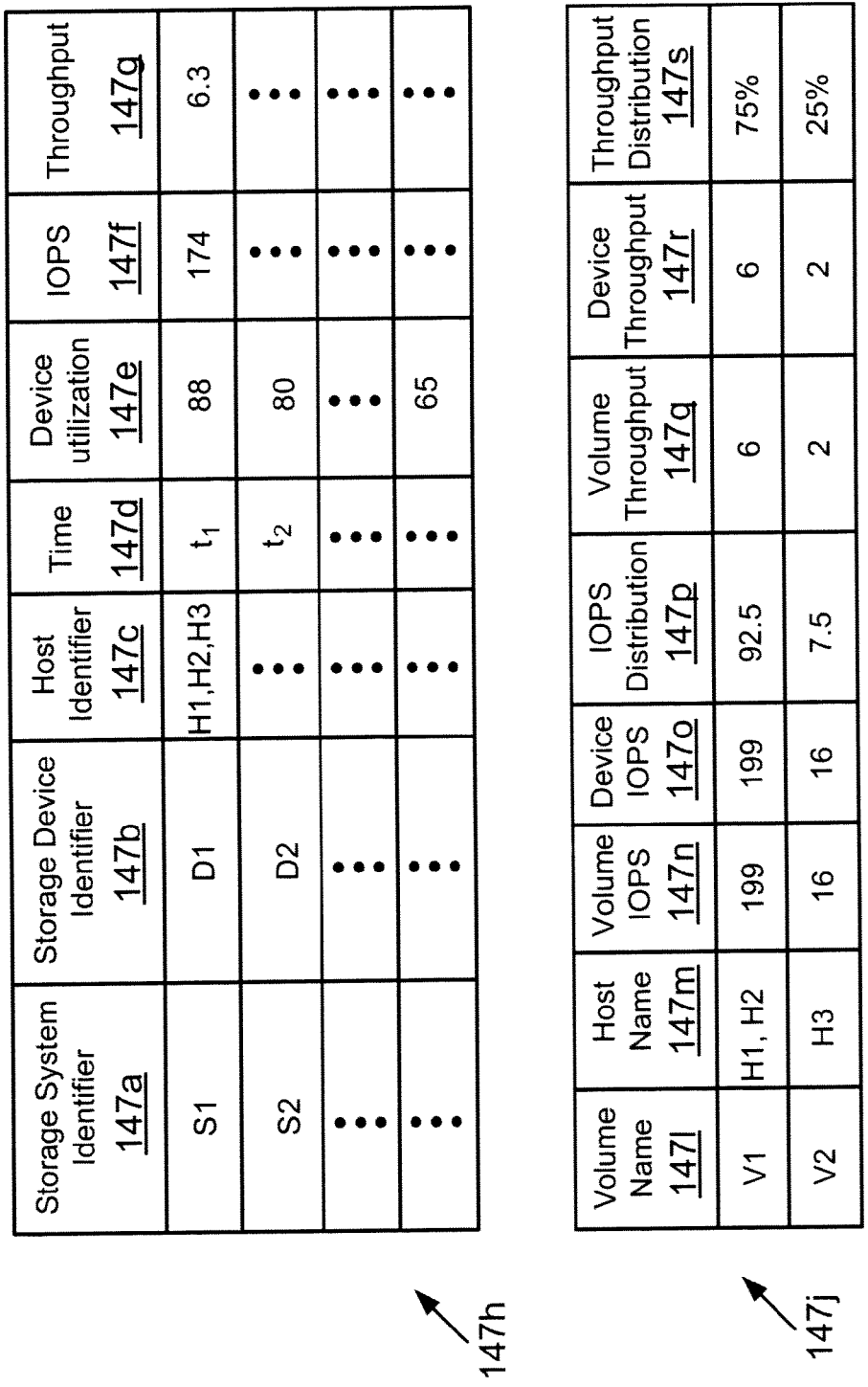
FIG. 1E shows examples of displays used for analyzing resource over utilization according to one embodiment.
Figures 1, 1F:
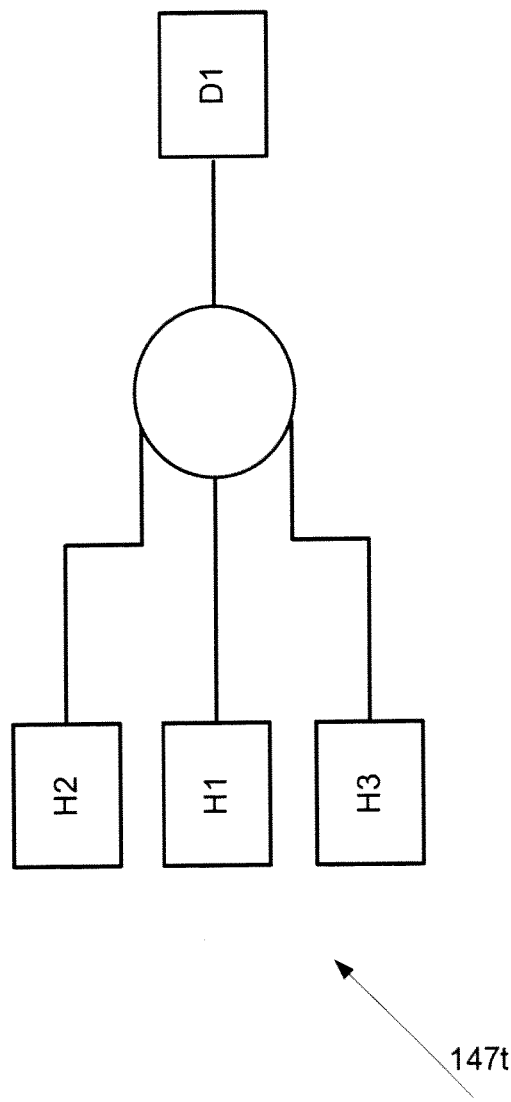
FIG. 1F-1 shows a topology used for verifying potential cause of storage device over utilization, according to one embodiment.
Figures 1, 1F, 2:
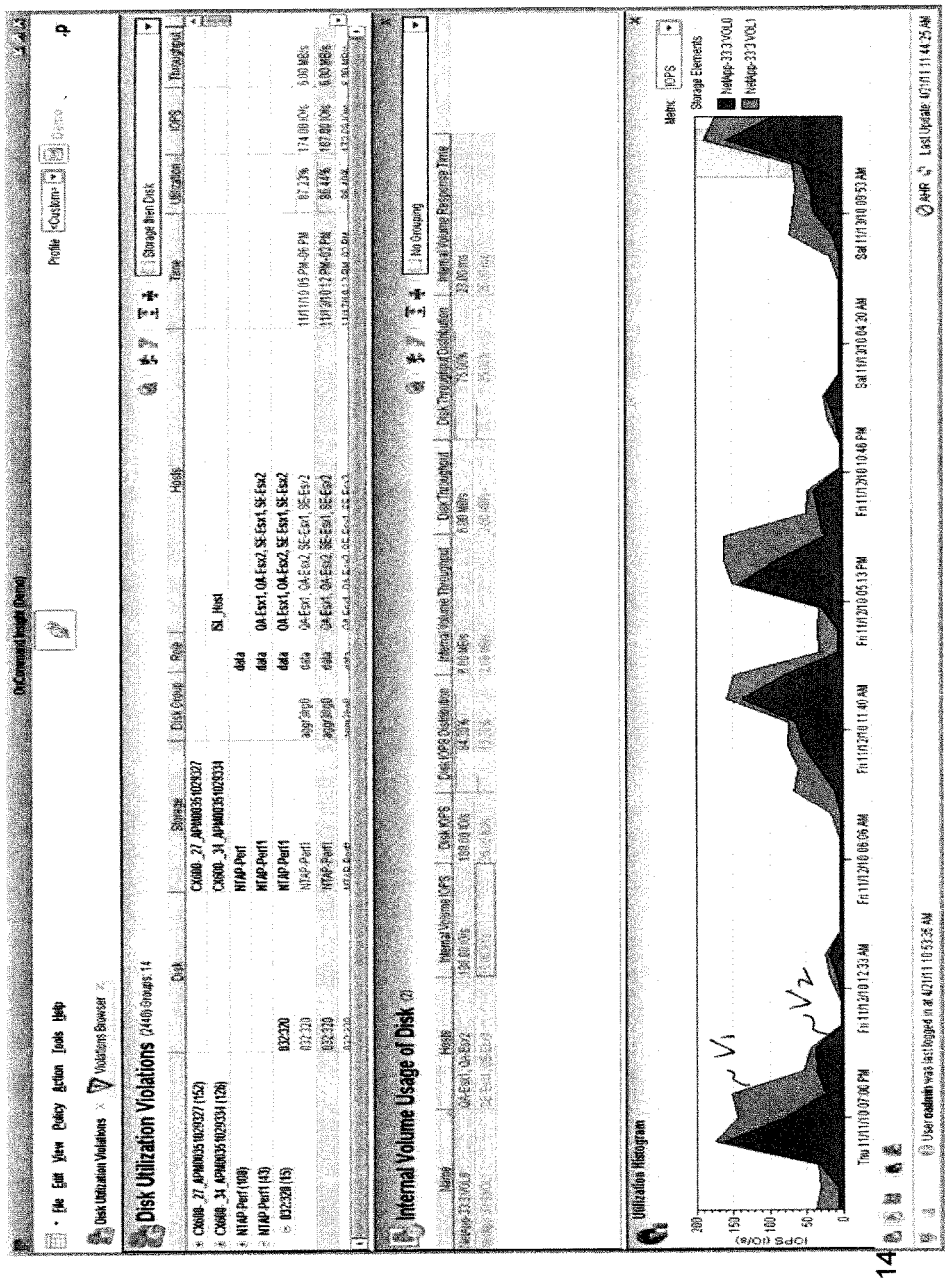
Figure 1G:
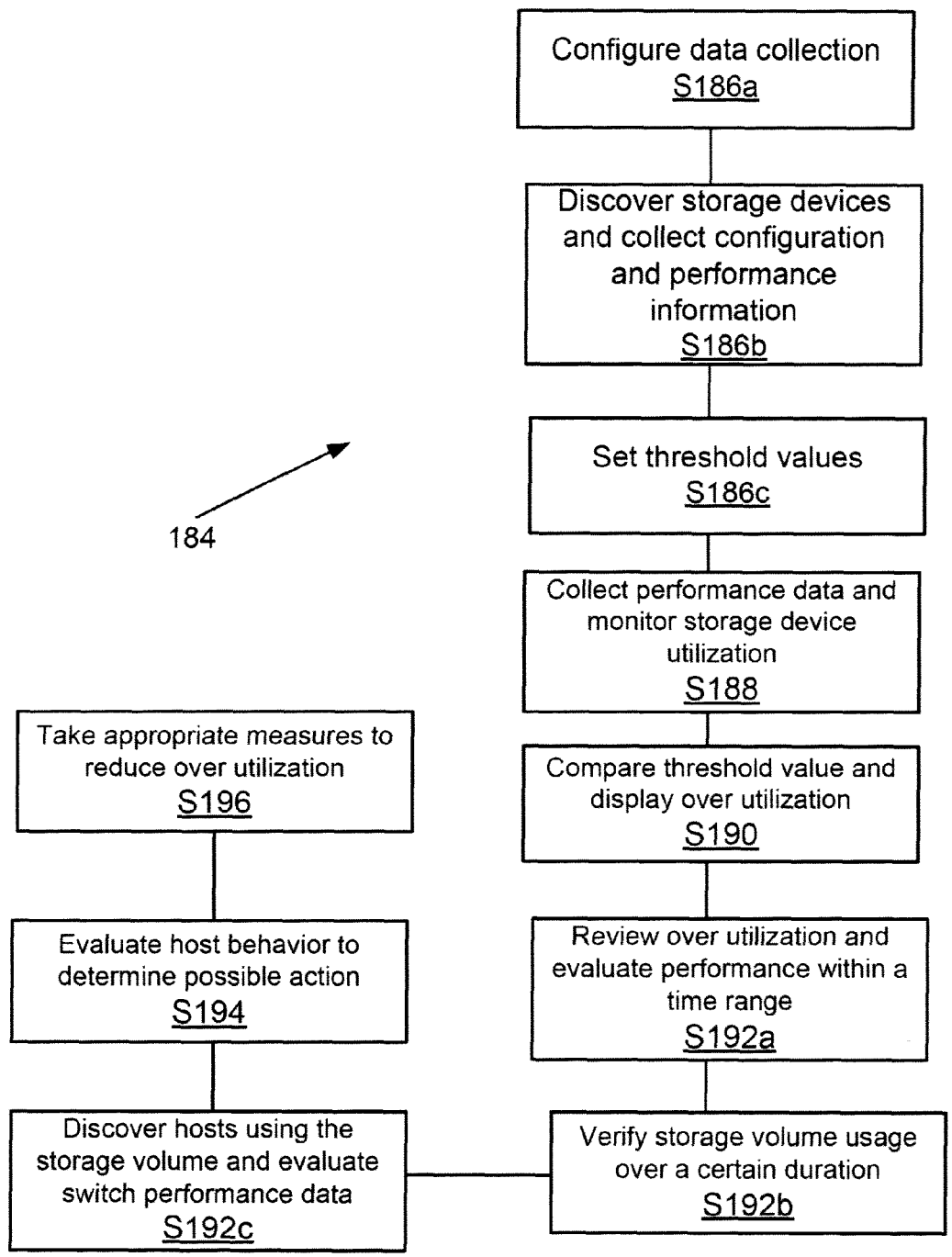
FIG. 1G shows another process flow diagram for analyzing storage device over utilization in a storage area network, according to one embodiment.

In one embodiment, blocks S178a-178c are iterative and are based on performance storage data 152a using various displays, e.g. 147h, 147j of FIG. 1E and the displays FIGS. 1F-1 and 1F-2. The user selects the row displaying information for storage device D1 in display 147h and is then provided with display 147j by performance module 140. Display 147j includes a plurality of columns 147l-147s and includes volume level details for storage device D1 that is over utilized.

Column 147l identifies the storage volumes that are associated with the over utilized storage device D1. For example, storage device D1 may include storage volumes V1 and V2. Column 147m shows hosts that access volumes V1 and V2. For example, hosts H1 and H2 access volume V1 and host H3 accesses volume V2. Column 147n shows the number of IOPS with respect to each volume. For example, the IOPS for volume V1 are 199 and 16 for V2. Column 147o shows the IOPS for device D1. Column 147p shows how the storage device IOPS are distributed among the volumes as a percentage. For example, V1 that is accessed by H1 contributes to 92.5% of the total IOPS for storage device D1, while V2 accessed by H2 contributes 7.5%.

Column 147q shows the throughput for each volume V1 and V2. Column 147r shows the throughput for the storage device. Column 147s shows the throughput distribution with respect each volume. For example, the throughput at volume V1 is 75% of the total throughput for device D1.

The display 147j identifies which volume and host may be causing the contention. For example, display 147j shows that volume V1 and hosts H1 and H2 may be causing storage device utilization.

In one embodiment, as shown in FIG. 1F-1, a user is provided with the network topology 147t where various host systems, for example, H1, H2 and H3 operate. The topology provides an overview of which host systems access the over utilized storage device and may be used to verify the potential cause of storage device over utilization.

In one embodiment, performance module 140 provides a graphical illustration to review the relative IOPS over a time range. This is shown as a screen shot 147u of FIG. 1F-2. Screenshot 147u shows a histogram/stacked area charts and shows the relative performance of storage volumes V1 and V2 over certain duration. The graphs may be used to highlights the duration when the storage volume is over utilized. Screen shot 147u allows a user to verify the potential cause storage device utilization based on the volumes identified in block S178a.

Based on displays 147j, 147u and 147t, a user may take corrective action in block S180 to reduce contention for storage device D1. For example, the user may choose to migrate volume V1, the one causing the over utilization to another storage device within system 100 that may be less utilized. In another example, the user may notify a host that may be using an application that may be causing the over utilization. The nature and the type of corrective action would depend on the cause of the over utilization.

FIG. 1G shows a process flow diagram 184 for managing resource contention, according to one embodiment. The process 184 is applicable to storage device 114 accessible via a SAN using one or more switches 120. Process blocks S186a, 186*b* and 186*c* in a SAN environment are similar to the process blocks S172*a*, S172*b* and 172*c* described above with respect to FIG. 1D.

Block S188 is similar to block S174 and block S190 is similar to block S176 that are described above with respect to FIG. 1D.

In block S192*a*, over utilization is reviewed and evaluated over a duration. Contention for storage device 114 is verified in block S192*b*.

In block S192*c*, the user discovers the host systems that are using storage device 114. If more than one host system is involved, then the user evaluates switch 120 performance by evaluating port traffic, as described below.

Figure 1H:
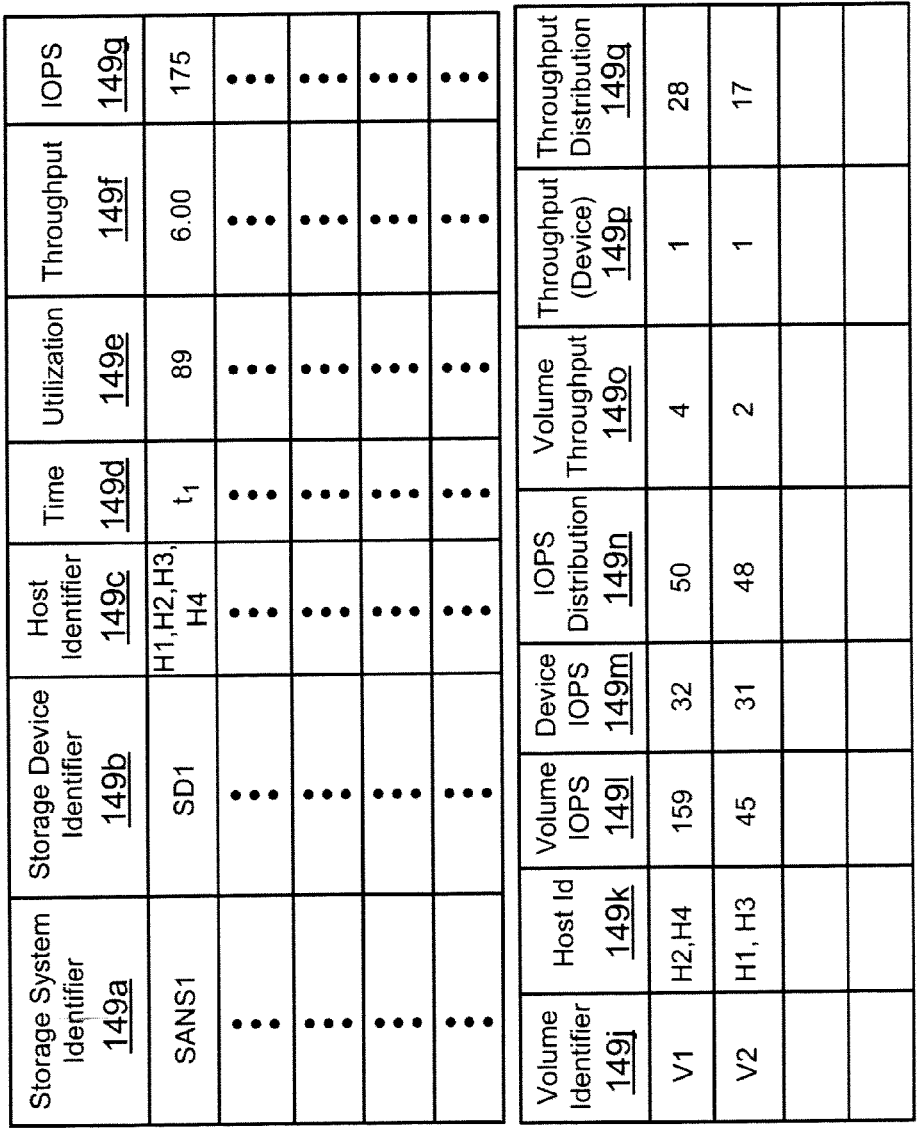
FIG. 1H shows examples of displays for analyzing storage device over utilization in a storage area network, according to one embodiment.
Figures 1, 1I:
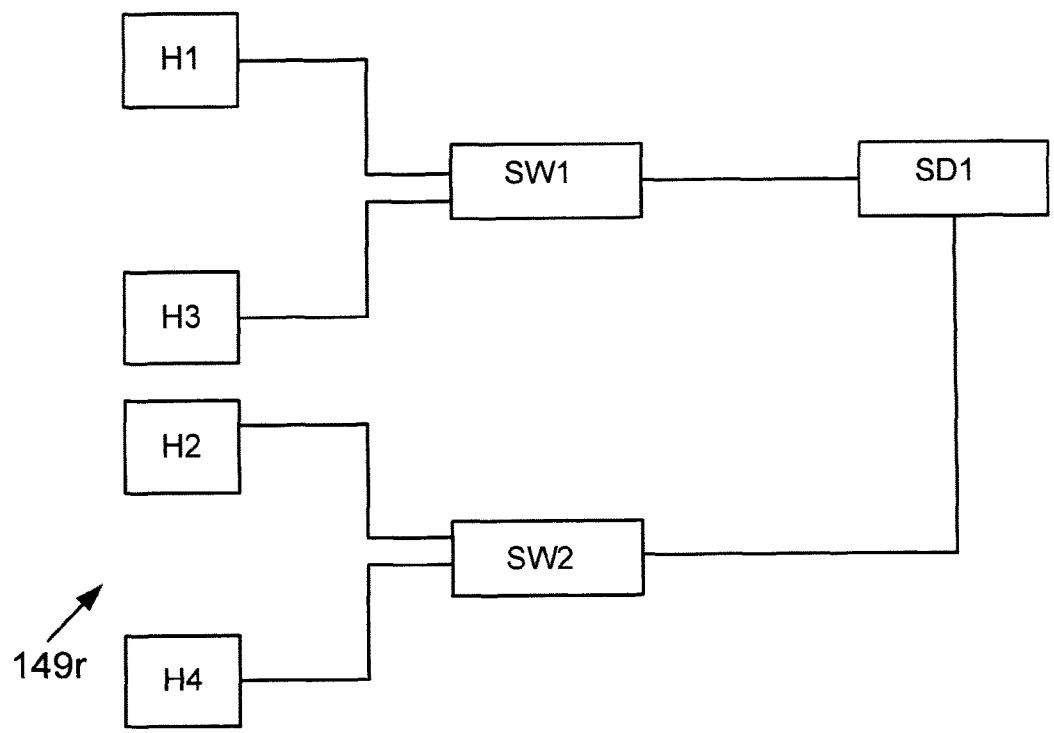
Figures 1, 1I, 2:
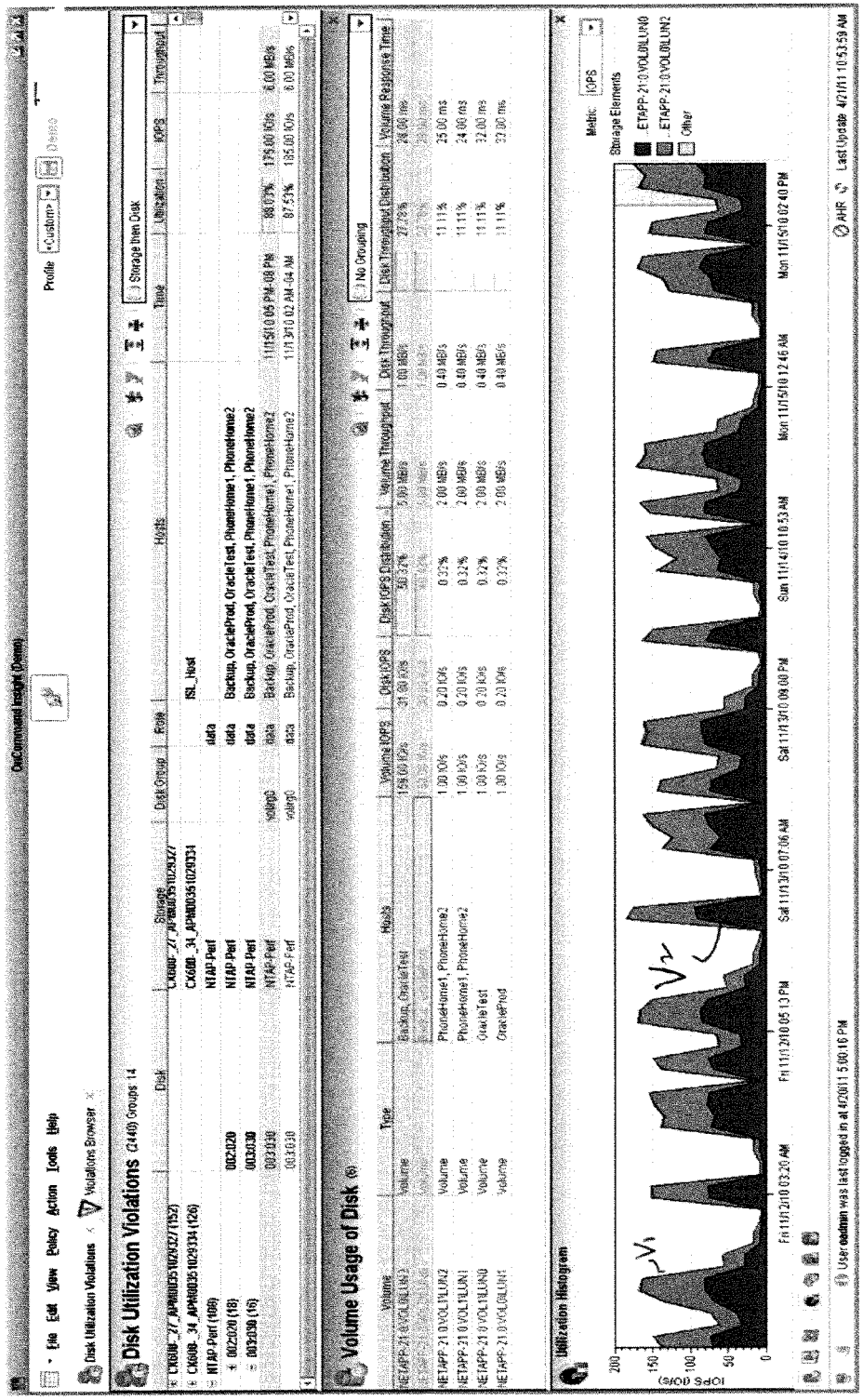
Figure 1J:
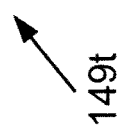
FIG. 1J shows an example of another display analyzing storage device over utilization in a storage area network, according to one embodiment.
Figure 1K:
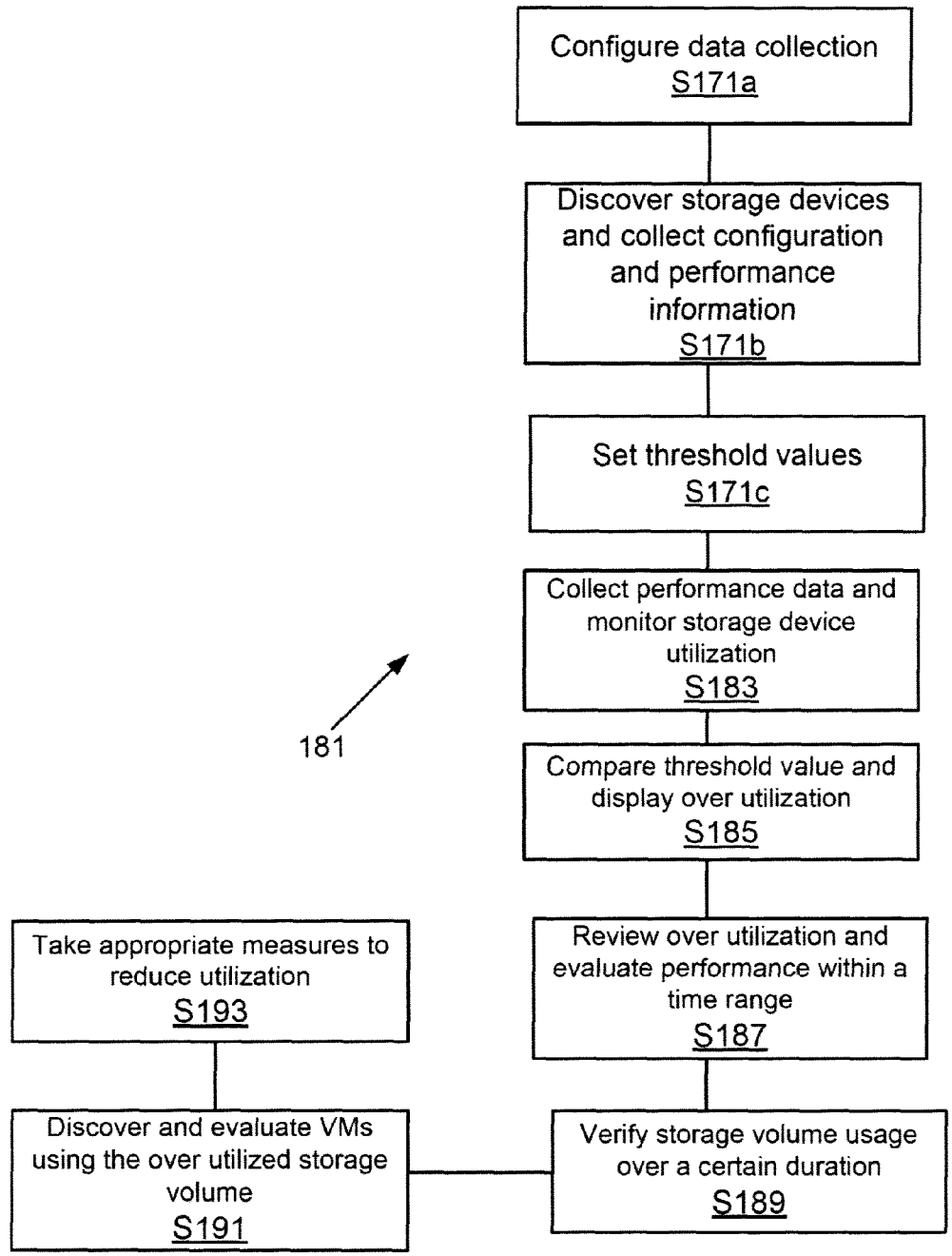
FIG. 1K shows another process flow diagram analyzing storage device over utilization in an environment having virtual machines, according to one embodiment.

FIGS. 1H-1J show various display structures that may be used for process blocks S192*a*-S192*c*, in one embodiment. The various display structures are based on switch configuration data 148*b*, switch performance data 152*b* and storage performance data 152*a* as well as storage configuration data 148*a* that are collected by acquisition module 144.

FIG. 1H shows a top-level display 149*h* that provides a storage system identifier in column 149*i* that identifies a storage system SANS1 managing a storage device 114. Column 149*b* identifies the storage device 114 as SD1, while column 149*c* identifies the different host systems that access storage device 114. Column 149*e* shows the storage device utilization at a certain time shown in column 149*d*. Column 149*f* shows the throughput for a time unit (e.g. the hour corresponding to the time in column 149*d*), while column 149*g* shows the number of IOPS for the time unit corresponding to the time in column 149*d*.

Referring back to FIG. 1H, by selecting the row with the over utilized storage device, a user is provided with display 149*i* that shows various parameters of the storage volumes of storage device 114. Display 149*i* identifies the storage volumes of storage device SD1 in column 149*j*, for example, V1 and V2. Column 149*k* shows the hosts that use the volumes, for example, hosts H2 and H4 use volume V1 and hosts H1 and H3 use volume V2. Column 149*l* shows the IOPS for each volume and column 149*m* shows IOPS for the storage device 114 corresponding to the time shown in column 149*d*. The IOPS distribution among the volumes is shown in column 149*n*. The volume throughput is shown in column 149*o*, while the device throughput is shown in column 149*p*. The throughput distribution is shown in column 149*q*.

The user is also able to view the network topology used in accessing storage device SD1. An example of the network topology 149*r* is provided in FIG. 1I-1, where switches SW1 and SW2 provide access to storage device SD1 to hosts H1, H2, H3 and H4.

The user can also view the IOPS for each volume over time in a graphical illustration as provided by the screen shot 149*s* of FIG. 1I-2. Screen shot 149*s* provides the relative performance of storage volumes V1 and V2 as a stacked chart (or histogram), similar to FIG. 1F-2. This allows the user to view volume access and behavior over a certain time interval and hence verify the potential cause of storage device over utilization.

The user is also able to view the performance of the switch 120 ports that are connected to the hosts of the volume that may be causing the over utilization at display 149*t* as shown in FIG. 1J. For example, column 149*u* identifies each switch SW1 and SW2. Column 149*v* identifies each port P1 and P2 of switch S1 and S2. Column 149*w* provides the transfer rate for each port associated with each device shown in column 149*x* (H2 and H4, respectively). Column 149*y* identifies the ports (PH1 and PH2) at the hosts that communicate with each switch SW1 and SW2.

By evaluating each storage volumes' IOPS and throughput and their contribution to the overall storage device IOPS and throughput, as well as the switch performance, the user is able to identify the hosts (e.g. H2 and H4 (FIG. 1H) that may be causing over utilization at any given time. This allows the user to take proactive measures in block S196. For example, the user may choose to move the volume that may be causing the over utilization to a different storage device which may not be used as much as storage device 114. The user may also determine that an application 106 at a server system 104 may not be behaving appropriately. The user may take an appropriate measure to correct application 106's behavior instead of moving the storage volume. In another example, the storage volume may be moved as well as the application behavior may be corrected.

FIG. 1K shows a process 181 for managing storage device utilization of a storage device accessed by VMs, according to one embodiment. The process begins in block S171*a* that is similar to process block S172*a* of FIG. 1D. Process blocks S171*b* and S171*c* are similar to process blocks S172*b* and S172*c* of FIG. 1D except they pertain to VMs. Process block S183 is similar to block S174 and process block S185 is similar to process block S176.

FIG. 1L shows an example of a display 195 presented on a display device to a user, according to one embodiment. Display 195 is based on storage configuration data 148*a*, storage performance data 152*a*, VM configuration data 148*c* and VM performance data 152, according to one embodiment. As described above, information regarding storage configuration data 148*a*, storage performance data 152*a*, VM configuration data 148*c* and VM performance data 152*c* is collected by acquisition module 144.

Display 195 identifies the storage systems that manage the storages devices 110 (and/or 114) in column 195*a*. The storage devices are identified in column 195*b* (for example, VSD1 . . . VSDn). The VMs are identified in column 195*c*, example, VM1 . . . VMn. The over utilization is shown in column 195*e* at time t1 (column 195*d*). The IOPS within a time unit (for example, the hour corresponding to time t1) are shown in column 195*f*. The throughput for storage device VSD1 is shown in column 185*g*. The throughput is also within a time unit, for example, the hour corresponding to time t1 (195*d*).

In block S187, the user reviews over utilization to determine which volume may be the potential cause of over utilization shown in display 195 of FIG. 1L. As an example, display 195*h* may be used to see the relative performance the volumes for the over utilized storage device VSD1. The different volumes, VMV1 and VMV2 are identified in column 195*i*. The VMs accessing the volumes are shown in column 195*j*. The volume IOPs for the time unit (t1, column 195*d*) are shown in column 195*k*. For example, Volume VMV1 accessed by VM1 and Vm2 has 6355 IO/s, compared to 27 for volume VMV2 within the same time unit. The storage device IOPS within the same time unit is shown in column 195*l*. The IOPS distribution is shown in column 195*m*. The volume throughput is shown in column 195*n*, while the storage device throughput is shown in column 195*o*. The distribution with respect to the storage device is shown in column 195*p*. By evaluating the performance of each volume, the user can determine that volume VMV1 accessed by VMs VM1 and VM2 may be causing the over utilization.

Figure 1M:
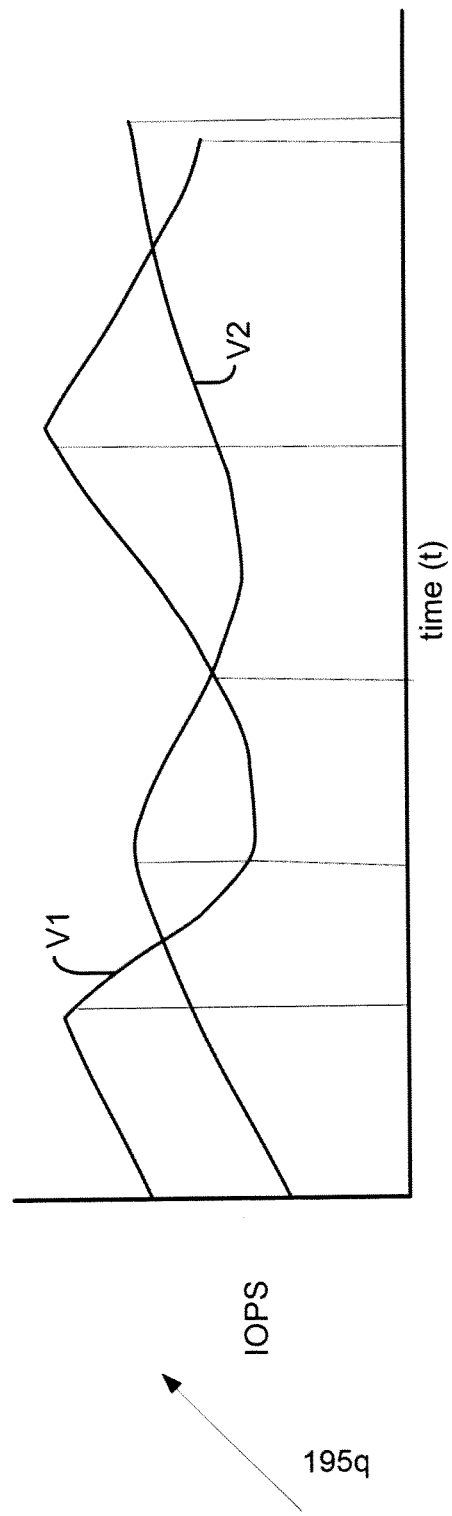
FIG. 1M graphically illustrates the relative performance of storage volumes for verifying storage device over utilization in an environment using virtual machines, according to one embodiment.

In block S189, the user verifies the volume performance by viewing a histogram/area graph 195*q* shown in FIG. 1M similar to the graphical illustration provided in FIGS. 1F-2 and 1I-2. This allows the user to verify the potential cause of storage device over utilization.

Figure 1N:
FIG. 1N shows an example of a display for verifying storage device over utilization in an environment using virtual machines, according to one embodiment.
Figure 2:
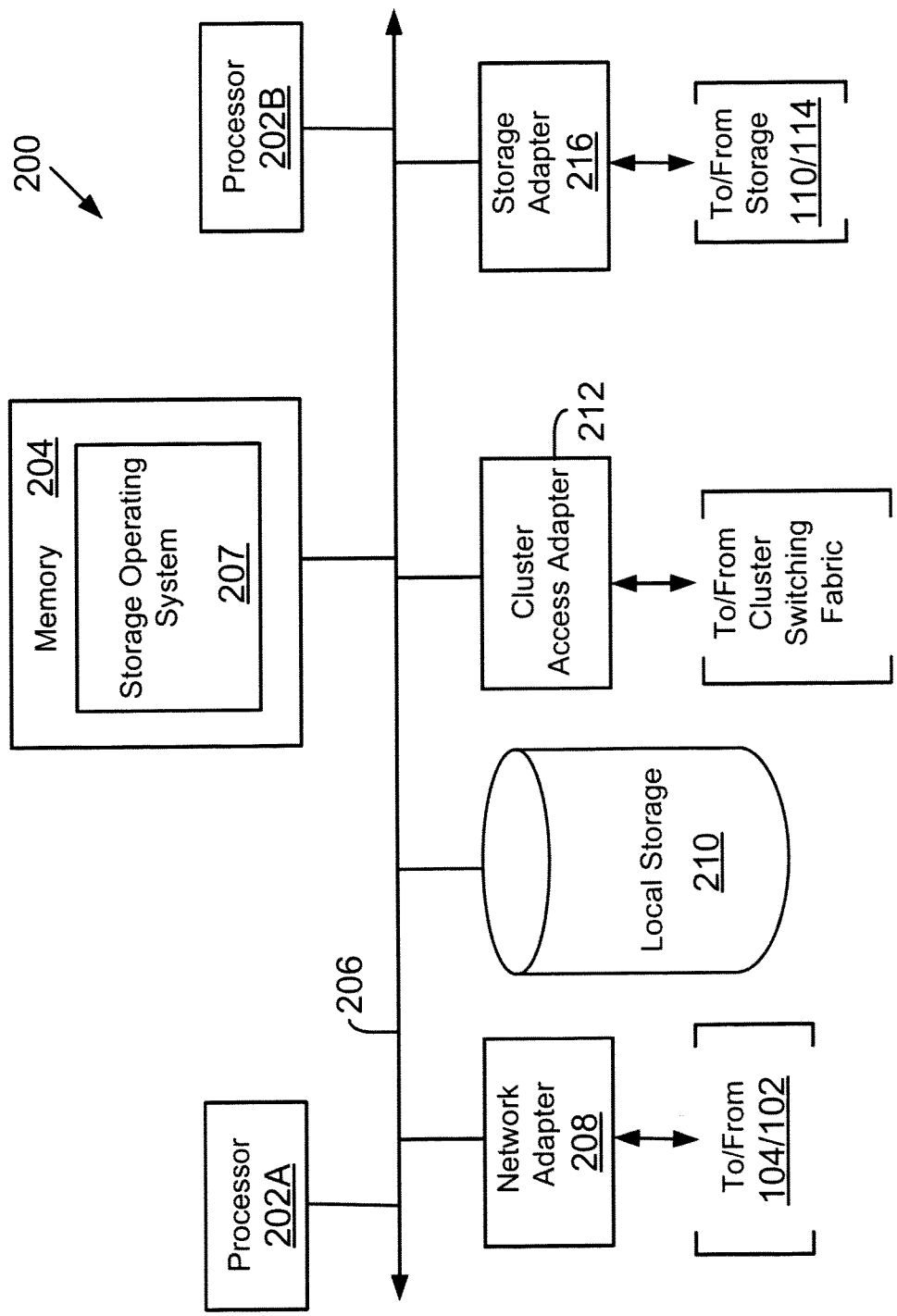

The user can also view VM behavior in block 5191 by using display 197 shown in FIG. 1N. Display 197 shows the virtual storage device name, referred to as VMdisk in column 197a. A VM disk is presented by VMM 130 to the VMs. The VMs using the virtual storage device are shown in column 197b. Column 197c shows that VM1 and VM2 may be driving the storage device utilization compared to VM3 and VM4 because the LOPS for VM1 and VM2 are 494 compared to 20 by VM3 and VM4. The throughput numbers in column 197d support the same conclusion because the throughput for VM1 and VM2 is 6 MB/s while the throughput for VM3 and VM4 is 1. The VMM 130 names are provided in column 197e. The VMM 130 names identify the VMM that present and manage VM1-VM4.

In block S193, appropriate action may be taken to modify VM behavior and/or move the storage volume to another storage device.

The embodiments disclosed herein provide an efficient solution for detecting resource contention and then determining the root cause of the resource contention. One does not have to manually request information from different entities to determine the root cause of resource contention at any given time. Because root cause is determined efficiently, one is able to take appropriate corrective action to reduce resource contention.

Storage System:

FIG. 2 is a block diagram of a computing system 200, according to one embodiment. System 200 may be used by a stand-alone storage system 108 and/or a storage system node operating within a cluster based storage system.

System 200 may include a plurality of processors 202A and 202B, a memory 204, a network adapter 208, a cluster access adapter 212 (used for a cluster environment), a storage adapter 216 and local storage 210 interconnected by a system bus 206. The local storage 210 comprises one or more storage devices, such as disks, utilized by the processors to locally store configuration and other information.

The cluster access adapter 212 comprises a plurality of ports adapted to couple system 200 to other nodes of a cluster (not shown). In the illustrative embodiment, Ethernet may be used as the clustering protocol and interconnect media, although it will be apparent to those skilled in the art that other types of protocols and interconnects may be utilized within the cluster architecture described herein.

System 200 is illustratively embodied as a dual processor storage system executing a storage operating system 207 that preferably implements a high-level module, such as a file system, to logically organize information as a hierarchical structure of named directories, files and special types of files called virtual disks (hereinafter generally "blocks") on storage devices 110/114. However, it will be apparent to those of ordinary skill in the art that the system 200 may alternatively comprise a single or more than two processor systems. Illustratively, one processor 202 executes the functions of an N-module on a node, while the other processor 202B executes the functions of a D-module.

The memory 204 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 207, portions of which is typically resident in memory and executed by the processing elements, functionally organizes the system 200 by, inter alia, invoking storage operations in support of the storage service provided by storage system 108. An example of operating system 207 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 208 comprises a plurality of ports adapted to couple the system 200 to one or more systems (e.g. 104/102) over point-to-point links, wide area networks, virtual private networks implemented over a public network (Internet) or a shared local area network. The network adapter 208 thus may comprise the mechanical, electrical and signaling circuitry needed to connect storage system 108 to the network. Illustratively, the computer network may be embodied as an Ethernet network or a FC network.

The storage adapter 216 cooperates with the storage operating system 207 executing on the system 200 to access information requested by the server systems 104 and management system 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 216 comprises a plurality of ports having input/output (I/O) interface circuitry that couples to the disks over an I/O interconnect arrangement, such as a conventional high-performance, FC link topology.

In another embodiment, instead of using a separate network and storage adapter, a converged adapter is used to process both network and storage traffic.

As described above in detail, storage operating system 207 provides storage configuration and performance data to acquisition module 144. The data is then used for executing the process steps of FIGS. 1C, 1D, 1G and 1K.

Figure 3:
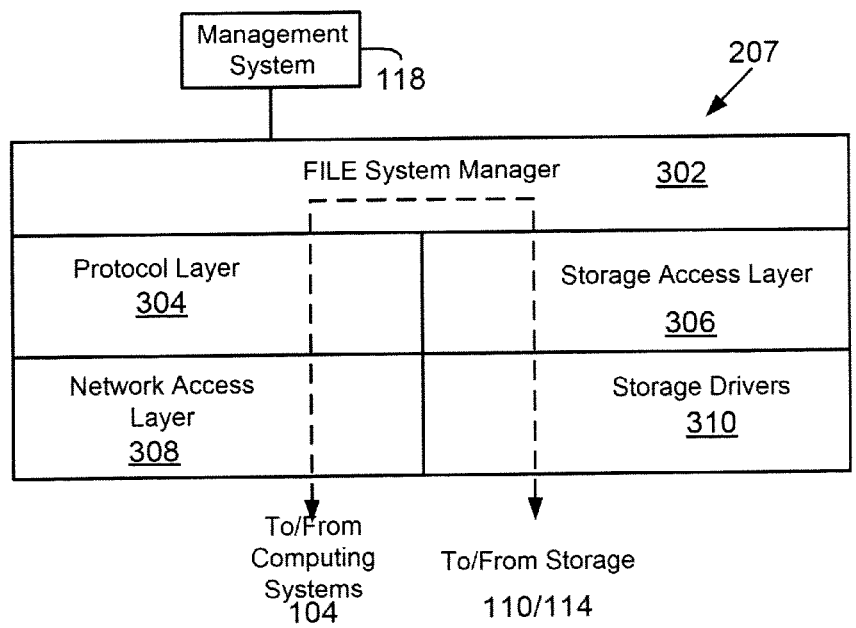
FIG. 3 shows an example of a storage operating system, used according to one embodiment.

Operating System:

FIG. 3 illustrates a generic example of operating system 207 executed by storage system 108, according to one embodiment of the present disclosure. Storage operating system 207 interfaces with management system 118 with information the various data structures maintained by management system 118, as described above in detail.

As an example, operating system 207 may include several modules, or "layers". These layers include a file system manager 302 that keeps track of a directory structure (hierarchy) of the data stored in storage devices and manages read/write operations, i.e. executes read/write operations on disks in response to server system 104 requests.

Operating system 207 may also include a protocol layer 304 and an associated network access layer 308, to allow system 200 to communicate over a network with other systems, such as server system 104, clients 102 and management system 118. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between server systems 104 and mass storage devices 110/114 are illustrated schematically as a path, which illustrates the flow of data through operating system 207.

The operating system 207 may also include a storage access layer 306 and an associated storage driver layer 310 to communicate with a storage device. The storage access layer 306 may implement a higher-level disk storage protocol, such as RAID (redundant array of inexpensive disks), while the storage driver layer 310 may implement a lower-level storage device access protocol, such as FC or SCSI.

It should be noted that the software "path" through the operating system layers described above needed to perform data storage access for a client request may alternatively be implemented in hardware. That is, in an alternate embodiment of the disclosure, the storage access request data path may be implemented as logic circuitry embodied within a field programmable gate array (FPGA) or an ASIC. This type of hardware implementation increases the performance of the file service provided by storage system 108.

As used herein, the term "storage operating system" generally refers to the computer-executable code operable on a computer to perform a storage function that manages data access and may, in the case of system 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
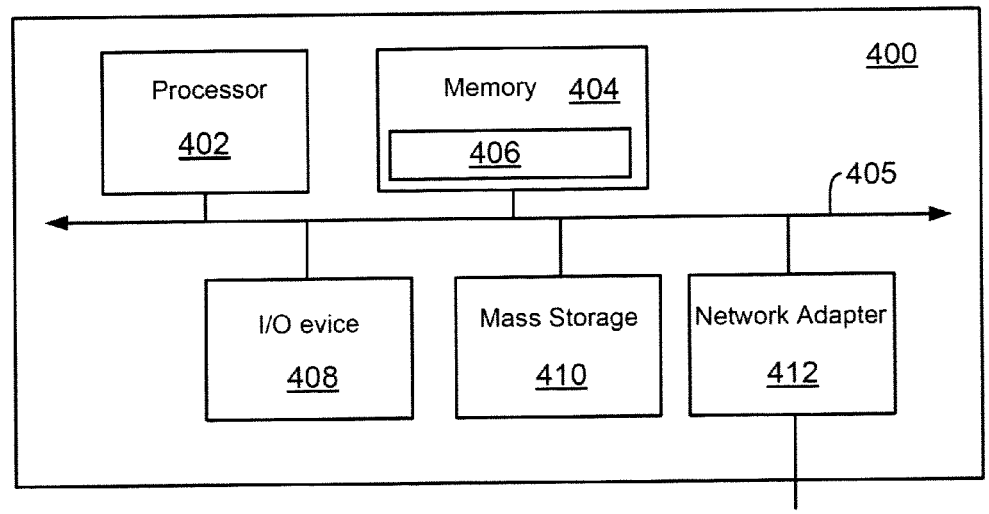
FIG. 4 shows an example of a processing system, used according to one embodiment.

Processing System:

FIG. 4 is a high-level block diagram showing an example of the architecture of a processing system, at a high level, in which executable instructions as described above can be implemented. The processing system 400 can represent modules of management system 118, clients 102, server systems 104 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain embodiments, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM) flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used by performance module 140, acquisition module 144, configuration module 142, GUI 136 as well as instructions for executing the process blocks FIGS. 1C, 1D and 1G.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The management system 118(and associated methods thereof) and storage systems described above can be a part of the server layer for providing storage services. Details regarding these layers are not germane to the inventive embodiments.

Thus, a method and apparatus for managing resources within system 100 have been described. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
identifying a plurality of resources for detecting resource contention in a networked storage system, the plurality of resources are used to access storage space at the networked storage system for storing information, wherein the plurality of resources include a plurality of storage devices and at least a switch;
configuring a threshold value for a parameter associated with each resource for detecting resource contention;
collecting performance data for each resource of the networked storage system;
monitoring each parameter of each resource during a certain duration for which the threshold value is configured;
identifying resource contention for a resource when a parameter associated with the resource has reached the configured threshold value for the parameter;
evaluating resource utilization and the parameter for a duration longer than the certain duration for confirming resource contention and that the configured threshold value is reached for the duration when resource contention is being evaluated;
initiating an iterative root cause analysis for determining a root cause for the resource contention; wherein the root cause analysis identifies users of the resource in contention and prioritizes overutilization conditions based on overutilization severity level; and
taking action for resolving resource contention, the action depending on resource type and reason for causing the resource contention;
wherein a storage device is in contention when an average number of input/output operations (IOPS) processed by the storage device for a plurality of storage volumes and an average amount of data transferred to and from the storage device for each storage volume has reached a threshold value;
wherein the switch is in contention when a transfer rate for a port of the switch reaches a threshold value indicating that the port is transferring more data for a resource user than a configured maximum transfer rate for the port; and
wherein the users of the resource in contention include a plurality of computer executable applications and a plurality of virtual machines and the root cause analysis evaluates the behavior of each user to determine the root cause of the contention.

2. The method of claim 1, wherein the switch is analyzed as a resource in contention when more than one computing device accesses storage space in the networked storage system.

3. The method of claim 1, wherein the performance data for each resource includes performance data for the plurality of storage devices with the average number of IOPS and average amount of data transferred for each storage device.

4. The method of claim 1, wherein the performance data for the switch includes storing data transfer rates for each port in a data structure.

5. A non-transitory, machine readable medium having stored thereon instructions for performing a method, comprising machine executable code which when executed by at least one machine causes the machine to:
identify a plurality of resources for detecting resource contention in a networked storage system, the plurality of resources are used to access storage space at the networked storage system for storing information, wherein the plurality of resources include a plurality of storage devices and at least a switch;
configure a threshold value for a parameter associated with each resource for detecting resource contention;
collect performance data for each resource of the networked storage system;
monitor each parameter of each resource during a certain duration for which the threshold value is configured;
identify resource contention for a resource when a parameter associated with the resource has reached the configured threshold value for the parameter;
evaluate resource utilization and the parameter for a duration longer than the certain duration for confirming resource contention and that the configured threshold value is reached for the duration when resource contention is being evaluated;
initiate an iterative root cause analysis for determining a root cause for the resource contention; wherein the root cause analysis identifies users of the resource in contention and prioritizes overutilization conditions based on overutilization severity level; and
take action for resolving resource contention, the action depending on resource type and reason for causing the resource contention;
wherein a storage device is in contention when an average number of input/output operations (IOPS) processed by the storage device for a plurality of storage volumes and an average amount of data transferred to and from the storage device for each storage volume has reached a threshold value;
wherein the switch is in contention when a transfer rate for a port of the switch reaches a threshold value indicating that the port is transferring more data for a resource user than a configured maximum transfer rate for the port; and
wherein the users of the resource in contention include a plurality of computer executable applications and a plurality of virtual machines and the root cause analysis evaluates the behavior of each user to determine the root cause of the contention.

6. The storage medium of claim 5, wherein the switch is analyzed as a resource in contention when more than one computing device accesses storage space in the networked storage system.

7. The storage medium of claim 5, wherein the performance data for each resource includes performance data for the plurality of storage devices with the average number of IOPS and average amount of data transferred for each storage device.

8. The storage medium of claim 5, wherein the performance data for the switch includes storing data transfer rates for each port in a data structure.

9. A system, comprising:
a memory containing machine readable medium comprising machine executable code having stored thereon instructions; and a processor module coupled to the memory, the processor module configured to execute the machine executable code to:
identify a plurality of resources for detecting resource contention in a networked storage system, the plurality of resources are used to access storage space at the networked storage system for storing information, wherein the plurality of resources include a plurality of storage devices and at least a switch;
configure a threshold value for a parameter associated with each resource for detecting resource contention;
collect performance data for each resource of the networked storage system;
monitor each parameter of each resource during a certain duration for which the threshold value is configured;
identify resource contention for a resource when a parameter associated with the resource has reached the configured threshold value for the parameter;
evaluate resource utilization and the parameter for a duration longer than the certain duration for confirming resource contention and that the configured threshold value is reached for the duration when resource contention is being evaluated;
initiate an iterative root cause analysis for determining a root cause for the resource contention; wherein the root cause analysis identifies users of the resource in contention and prioritizes overutilization conditions based on overutilization severity level; and
take action for resolving resource contention, the action depending on resource type and reason for causing the resource contention;
wherein a storage device is in contention when an average number of input/output operations (IOPS) processed by the storage device for a plurality of storage volumes and an average amount of data transferred to and from the storage device for each storage volume has reached a threshold value;
wherein the switch is in contention when a transfer rate for a port of the switch reaches a threshold value indicating that the port is transferring more data for a resource user than a configured maximum transfer rate for the port; and
wherein the users of the resource in contention include a plurality of computer executable applications and a plurality of virtual machines and the root cause analysis evaluates the behavior of each user to determine the root cause of the contention.

10. The system of claim 9, wherein the switch is analyzed as a resource in contention when more than one computing device accesses storage space in the networked storage system.

11. The system of claim 9, wherein the performance data for each resource includes performance data for the plurality of storage devices with the average number of IOPS and average amount of data transferred for each storage device.

12. The system of claim 9, wherein the performance data for the switch includes storing data transfer rates for each port in a data structure.

* * * * *